(12) United States Patent
Sunatori

(10) Patent No.: US 7,748,569 B2
(45) Date of Patent: Jul. 6, 2010

(54) SELF-SEALING AUTO-ALIGNING MAGNETICALLY-HANGING SPICE DISPENSER

(76) Inventor: Go Simon Sunatori, 65, des Parulines, Gatineau, QC (CA) J9A 1Z4

( * ) Notice: Subject to any disclaimer, the term of this patent is extended or adjusted under 35 U.S.C. 154(b) by 389 days.

(21) Appl. No.: 11/855,150

(22) Filed: Sep. 13, 2007

(65) Prior Publication Data
US 2008/0302820 A1 Dec. 11, 2008

(30) Foreign Application Priority Data
Jun. 8, 2007  (CA) .................................... 2595278

(51) Int. Cl.
*A47G 19/00* (2006.01)
(52) U.S. Cl. ................. 222/142.3; 206/818; 211/DIG. 1
(58) Field of Classification Search .............. 222/134.3, 222/197.5, 565, 142.9, 179.5, 180; 211/74, 211/76, DIG. 1; 248/309.4, 316.8, 321, 321.1; 206/818
See application file for complete search history.

(56) References Cited

U.S. PATENT DOCUMENTS

| | | | | | |
|---|---|---|---|---|---|
| 131,744 | A | * | 10/1872 | Cooley | ........................ 222/480 |
| 2,029,219 | A | * | 1/1936 | Bourland | .................... 222/480 |
| 2,049,795 | A | * | 8/1936 | Barnby | ........................ 222/548 |
| 2,551,203 | A | * | 5/1951 | Wheaton | .................... 222/542 |
| 2,642,999 | A | * | 6/1953 | Mcpherson | .................. 211/65 |
| 3,325,066 | A | * | 6/1967 | Allen | .......................... 222/545 |
| D291,536 | S | * | 8/1987 | Crawford et al. | ............. D9/440 |
| 5,163,566 | A | * | 11/1992 | Hempel | ........................ 211/65 |
| 5,301,822 | A | * | 4/1994 | Coleman et al. | ........... 211/70.6 |
| 5,368,203 | A | | 11/1994 | Friedrich et al. | |
| 5,407,107 | A | * | 4/1995 | Smith | .......................... 222/548 |

FOREIGN PATENT DOCUMENTS

CA  2 349 889 A1  12/2002
CA  2 595 278 A1  2/2009

OTHER PUBLICATIONS

The Magic Spicer—Cooking Club of America <http://www.cookingclub.com/Reviews/Review.aspx?id=123142>.

* cited by examiner

*Primary Examiner*—Lien T Ngo

(57) ABSTRACT

A hanging spice dispenser comprises a plate assembly and a container assembly for storing spices. The plate assembly comprises a non-magnetic planer plate and a plurality of magnetic elements embedded at pre-determined locations. The container assembly comprises a generally cylindrical spice container, a removable cap and a magnetic element. Magnetic attraction force between the magnetic element of the container assembly and the magnetic element of the plate assembly is exerted when the container assembly is placed in proximity to the plate assembly. The container assembly is capable of detaching from the bottom surface of the plate assembly when force is applied to the container assembly. The removable cap and the plate assembly form self-seal in order to prevent air and moisture from entering into the generally cylindrical container. This invention relates to spice dispensers, and the principal use of the invention is for dispensing spices in a kitchen.

15 Claims, 8 Drawing Sheets

SELF-SEALING AUTO-ALIGNING MAGNETICALLY-HANGING SPICE DISPENSER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

This invention relates to spice dispensers, more particularly to a magnetically-hanging spice dispenser.

There are many instances where it would be desirable to be able to save space in a kitchen by hanging spice containers, and to save time by eliminating the need for opening and closing the spice containers.

A number of patents disclose various kinds of hanging spice dispensers.

U.S. Pat. No. 5,368,203 discloses "Spice rack with magnetically held spice containers". The spice container is retained in or on the closure body by a magnetic force which is used to seal the spice container. However, the magnet and the seal are both located on the spice rack, so this prior art spice dispenser accommodates spice containers having only one shape and one size, and the spice container has limited single-row positions for hanging. In addition, the complicated spice rack structure is difficult to clean, if not impossible.

U.S. Pat. No. 7,007,818 discloses "Container assembly". The spice rack assembly includes a rack and at least one container that is magnetically coupled to the rack. Since the magnet attaches to a ferromagnetic plate, this prior art spice dispenser lacks an auto-aligning feature. Also, this prior art spice dispenser does not have a self-sealing feature. Moreover, this prior art spice dispenser requires the users to manually open and close holes after each use.

Canadian Patent 2 349 889 discloses "Magnetically Hanging Spice/Sauce Dispenser System". The hanging spice/sauce dispenser system comprises a planer ferromagnetic plate and a container assembly. This prior art spice dispenser does not have an auto-aligning feature because of the use of a ferromagnetic plate. Furthermore, this prior art spice dispenser lacks a hole-size selector.

These prior art arrangements do not have a hanging spice dispenser which has magnetic elements at pre-determined locations for auto-aligning attachment, and has a self-sealing cap for eliminating the need for opening and closing the spice container.

BRIEF SUMMARY OF THE INVENTION

It is a primary object of the invention to provide a hanging spice dispenser which has magnetic elements at pre-determined locations for auto-aligning attachment.

It is another object of the invention to provide a hanging spice dispenser which has a self-sealing cap for eliminating the need for opening and closing the spice container.

It is another object of the invention to provide a hanging spice dispenser which has a spice container that can be attached with one hand, and be detached with one hand.

It is another object of the invention to provide a hanging spice dispenser which is easy to clean.

It is another object of the invention to provide a hanging spice dispenser which has a rotatable cover capable of selecting either large-size holes or small-size holes on the removable cap.

It is another object of the invention to provide a hanging spice dispenser which has a continuously-variable hole-size selector.

A hanging spice dispenser comprises a plate assembly and a container assembly for storing spices. The plate assembly comprises a non-magnetic planer plate and a plurality of magnetic elements embedded at pre-determined locations. The container assembly comprises a generally cylindrical spice container, a removable cap and a magnetic element. Magnetic attraction force between the magnetic element of the container assembly and the magnetic element of the plate assembly is exerted when the container assembly is placed in proximity to the plate assembly. The container assembly is capable of detaching from the bottom surface of the plate assembly when force is applied to the container assembly. The removable cap and the plate assembly form self-seal in order to prevent air and moisture from entering into the generally cylindrical container.

BRIEF DESCRIPTION OF THE SEVERAL VIEWS OF THE DRAWING

In drawings which illustrate embodiments of the invention.

DETAILED DESCRIPTION OF THE INVENTION

Figure 1:
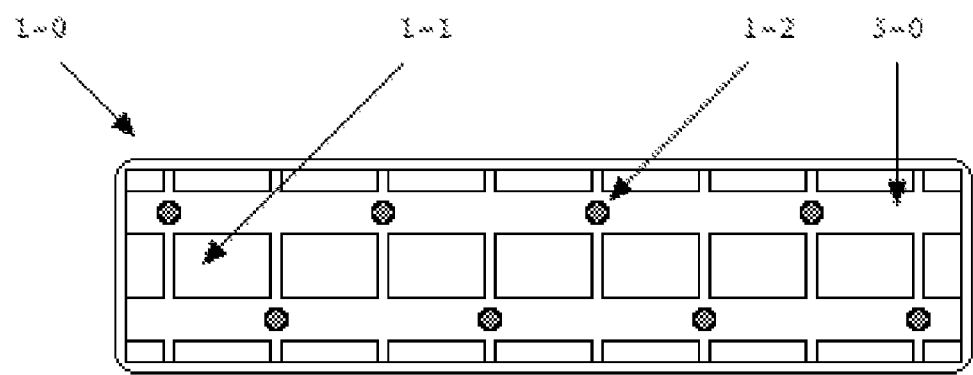
FIG. 1 is a top view of one embodiment of the hanging spice dispenser according to the invention.
Figure 2:
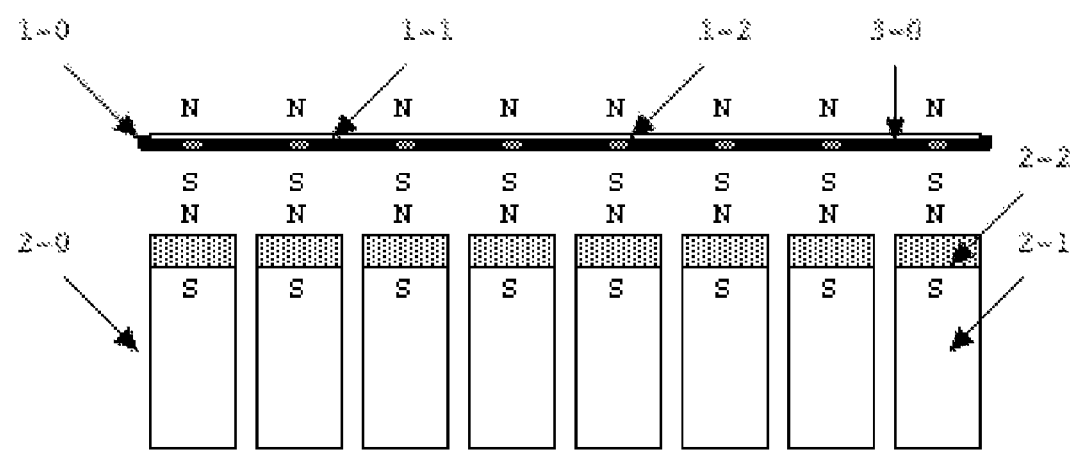
FIG. 2 is a front view of the hanging spice dispenser in a detached position.
Figure 3:
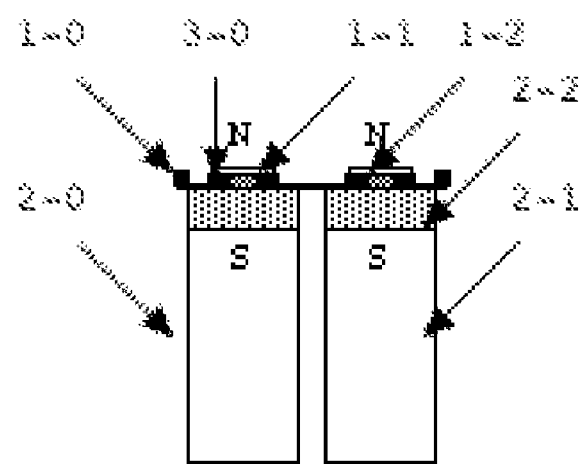
FIG. 3 is a side view of the hanging spice dispenser in an attached position.

In one embodiment of the invention shown in FIG. 1 (top view), in FIG. 2 (front view) and in FIG. 3 (side view), a hanging spice dispenser comprises a plate assembly 1-0 and a container assembly 2-0 for storing spices.

The plate assembly 1-0 has a top surface and a bottom surface. The plate assembly 1-0 comprises a non-magnetic planer plate 1-1 and a plurality of magnetic elements 1-2.

The non-magnetic planer plate 1-1 of the plate assembly 1-0 has a flat bottom surface. The non-magnetic planer plate 1-1 of the plate assembly 1-0 is capable of being securely mounted horizontally.

The plurality of magnetic elements 1-2 of the plate assembly 1-0 are embedded in the non-magnetic planer plate 1-1 of the plate assembly 1-0 at pre-determined locations.

Figure 4:
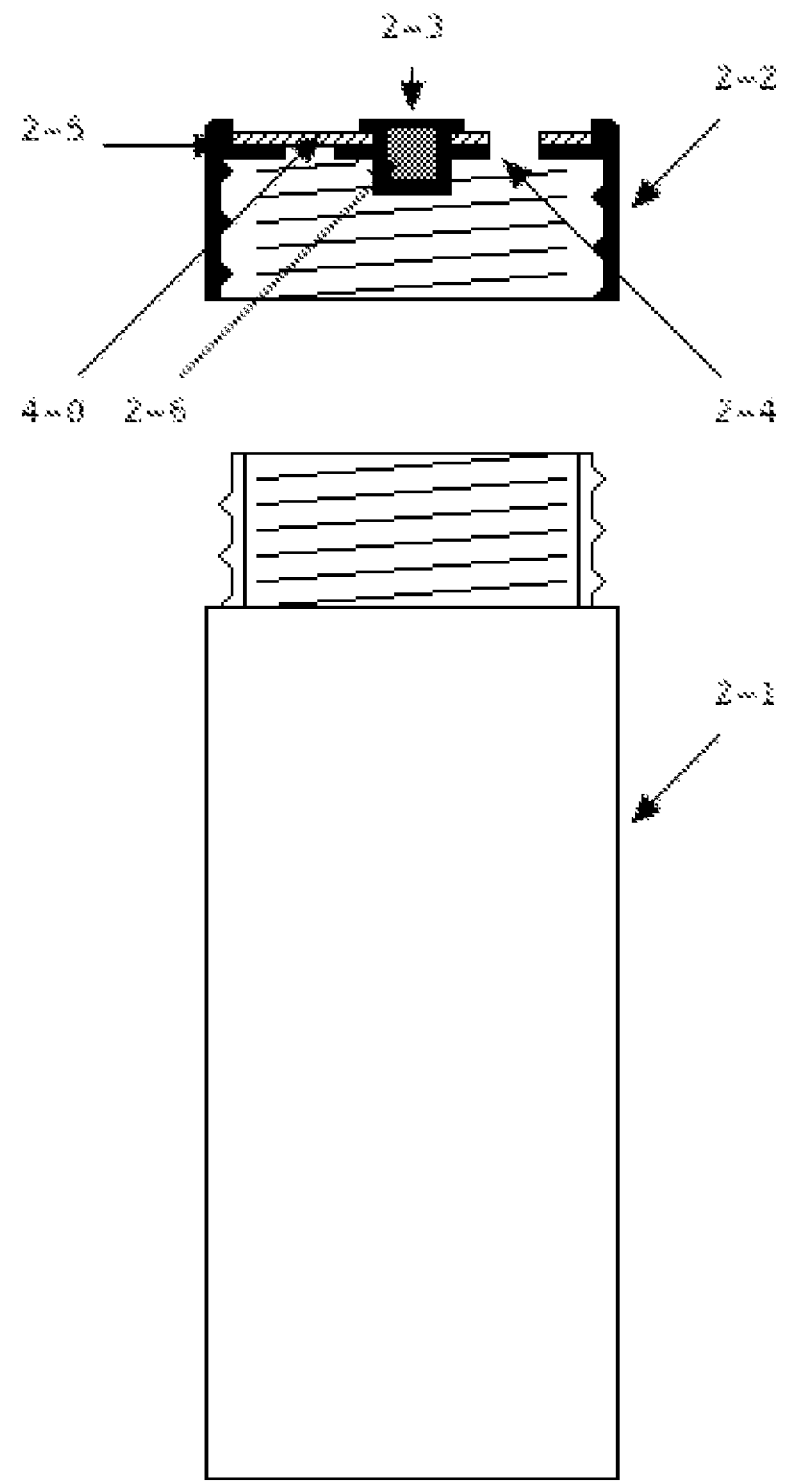
FIG. 4 is an exploded sectional view of the container assembly.

FIG. 4 shows an exploded sectional view of the container assembly 2-0.

The container assembly 2-0 comprises a generally cylindrical spice container 2-1, a removable cap 2-2 and a magnetic element 2-6.

The removable cap 2-2 of the container assembly 2-0 has a central portion 2-3, a middle portion 2-4 and a peripheral portion 2-5. The removable cap 2-2 of the container assembly 2-0 is removably attached to the generally cylindrical spice container 2-1 of the container assembly 2-0. The middle portion 2-4 of the removable cap 2-2 of the container assembly 2-0 has portions defining a plurality of holes for dispensing spices.

The magnetic element 2-6 of the container assembly 2-0 is securely attached to the removable cap 2-2 of the container assembly 2-0, either at the central portion 2-3 or at the peripheral portion 2-5.

magnetic attraction force between the magnetic element 2-6 of the container assembly 2-0 and the magnetic element 1-2 of the plate assembly 1-0 is exerted when the container assembly 2-0 is placed in proximity to the plate assembly 1-0.

The container assembly 2-0 is capable of magnetically attaching to the bottom surface of the plate assembly 1-0.

The container assembly 2-0 is capable of detaching from the bottom surface of the plate assembly 1-0 when force is applied to the container assembly 2-0.

The removable cap 2-2 of the container assembly 2-0 and the bottom surface of the plate assembly 1-0 form self-seal in order to prevent air and moisture from entering into the generally cylindrical container 2-1 of the container assembly 2-0 when the container assembly 2-0 is magnetically attached to the plate assembly 1-0.

The plate assembly 2-0 may further comprise an adhesive 3-0 taped on the non-magnetic planer plate 1-1 of the plate assembly 1-0 in order to securely attach the plate assembly 1-0 to a horizontal bottom portion of a kitchen cabinet or a shelf.

The non-magnetic planer plate 1-1 of the plate assembly 1-0 may have portions defining a hole in order to receive a screw or a nail.

The plurality of magnetic elements 1-2 embedded in the non-magnetic planer plate 1-1 of the plate assembly 1-0 may be invisible from the outside. Alternatively, the plurality of magnetic elements 1-2 embedded in the non-magnetic planer plate 1-1 of the plate assembly 1-0 may be exposed.

Each magnetic element 1-2 of the plate assembly 1-0 may be disc-shaped or ring-shaped.

The generally cylindrical spice container 2-1 of the container assembly 2-0 may be transparent or translucent. The generally cylindrical spice container 2-1 of the container assembly 2-0 may be made of glass or plastic.

The removable cap 2-2 of the container assembly 2-0 may be made of plastic.

Figure 5:
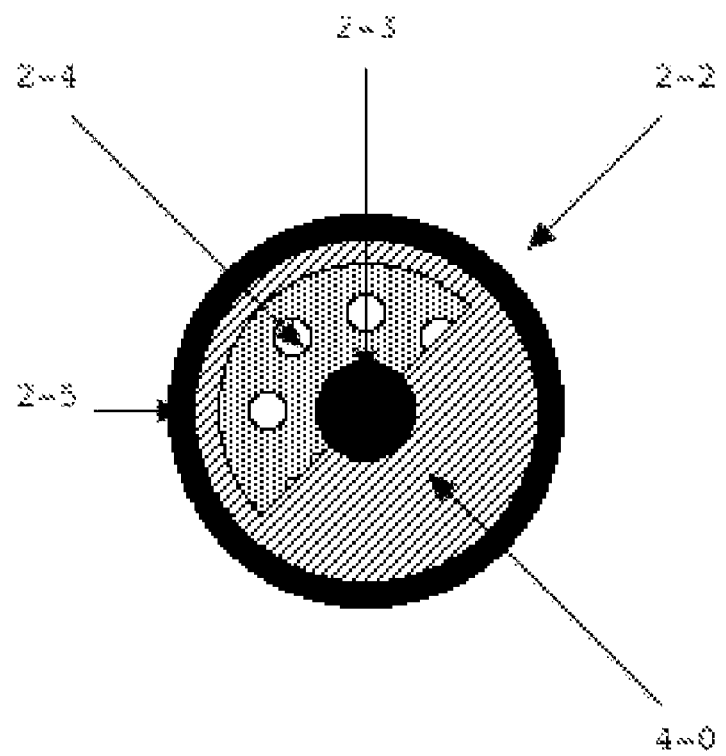
FIG. 5 is a top view of the container assembly with large holes exposed.
Figure 6:
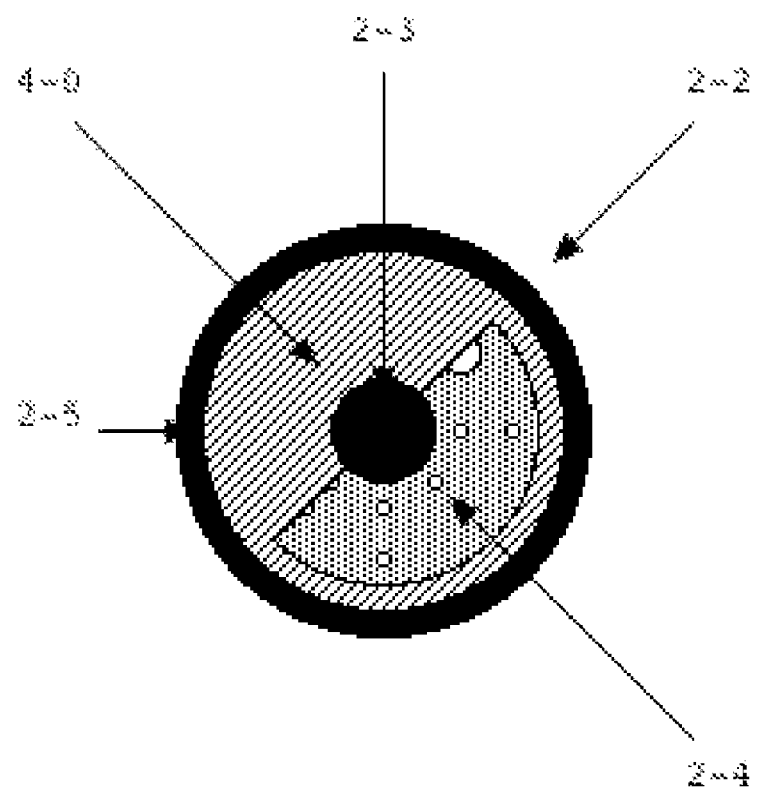
FIG. 6 is a top view of the container assembly with small holes exposed.

FIG. 5 is a top view of the container assembly 2-0 with large holes exposed. FIG. 6 is a top view of the container assembly 2-0 with small holes exposed.

The removable cap 2-2 of the container assembly 2-0 may have a plurality of large-size holes in one half of the middle portion 2-4, and a plurality of small-size holes in one half of the middle portion 2-4.

The removable cap 2-2 of the container assembly 2-0 may further comprise a generally semi-circular cover 4-0 for covering one half of the middle portion 2-4 of the removable cap 2-2 of the container assembly 2-0. The generally semi-circular cover 4-0 is rotatably mounted on the removable cap 2-2. The generally semi-circular cover 4-0 is capable of selecting either the large-size holes or the small-size holes in the middle portion 2-4 of the removable cap 2-2 of the container assembly 2-0.

Alternatively, the removable cap 2-2 of the container assembly 2-0 may have a plurality of large-size holes in one third of the middle portion 2-4, a plurality of mid-size holes in one third of the middle portion 2-4, and a plurality of small-size holes in one third of the middle portion 2-4.

The removable cap 2-2 of the container assembly 2-0 may further comprise a generally semi-circular cover 4-0 for covering two thirds of the middle portion 2-4 of the removable cap 2-2 of the container assembly 2-0. The generally semi-circular cover 4-0 is rotatably mounted on the removable cap 2-2. The generally semi-circular cover 4-0 is capable of selecting either the large-size holes, the mid-size holes or the small-size holes in the middle portion 2-4 of the removable cap 2-2 of the container assembly 2-0.

Figure 7:
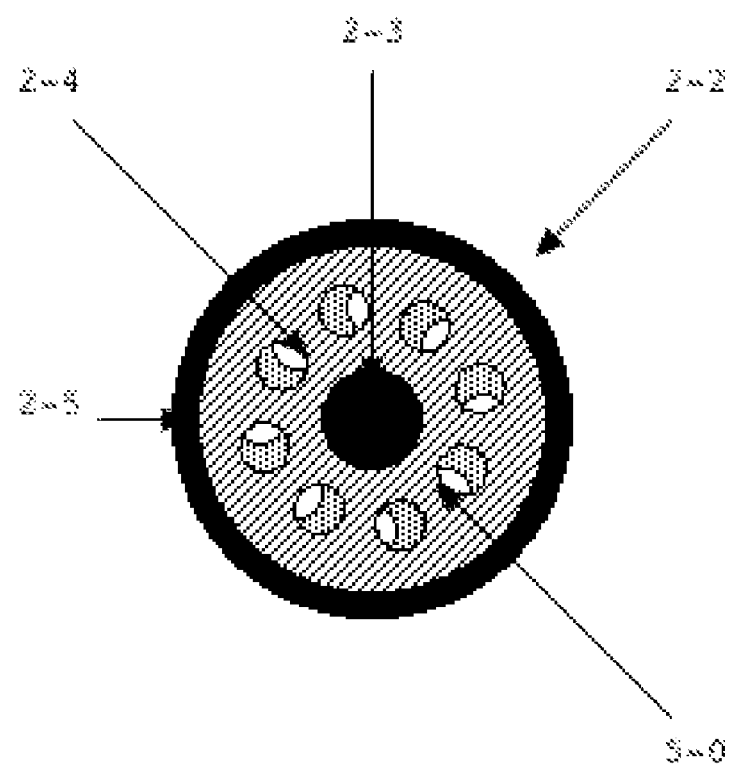
FIG. 7 is a top view of the container assembly with large holes defined.
Figure 8:
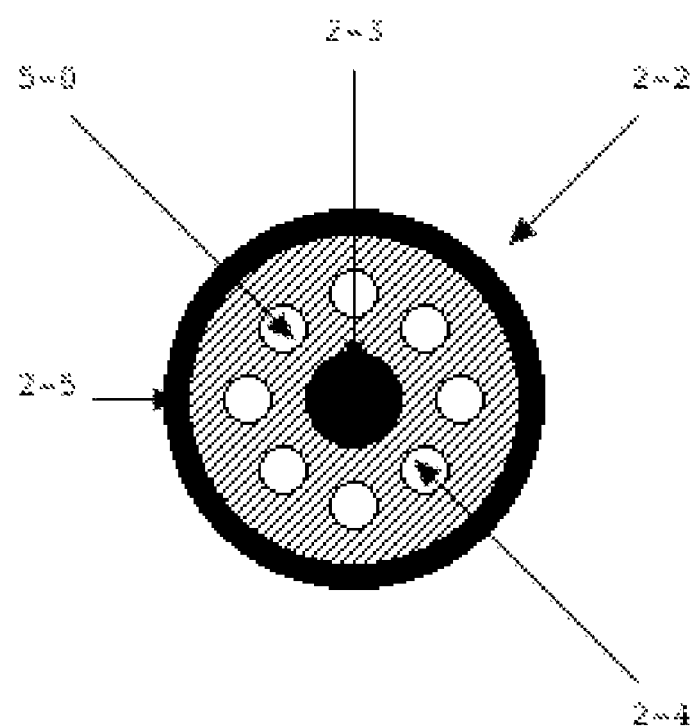
FIG. 8 is a top view of the container assembly with small holes defined.

FIG. 7 is a top view of the container assembly 2-0 with large holes defined. FIG. 8 is a top view of the container assembly 2-0 with small holes defined.

Preferably, the removable cap 2-2 of the container assembly 2-0 may further comprise a generally circular cover 5-0 for covering the middle portion 2-4 of the removable cap 2-2 of the container assembly 2-0. The generally circular cover 5-0 is rotatably mounted on the removable cap 2-2. The generally circular cover 5-0 has portions defining a plurality of holes. The holes on the generally circular cover 5-0 are capable of variably overlapping with the holes in the middle portion 2-4 of the removable cap 2-2 of the container assembly 2-0 so that spices can be dispensed at continuously variable flow rate.

The removable cap 2-2 of the container assembly 2-0 may screw into the generally cylindrical container 2-1 of the container assembly 2-0. Alternatively, the removable cap 2-2 of the container assembly 2-0 may snap into the generally cylindrical container 2-1 of the container assembly 2-0.

Preferably, the magnetic element 2-6 of the container assembly 2-0 is embedded in the removable cap 2-2 of the container assembly 2-0. The magnetic element 2-6 of the container assembly 2-0 may be invisible from the outside. Alternatively, the magnetic element 2-6 of the container assembly 2-0 may be exposed.

Each magnetic element 2-6 of the container assembly 2-0 may be disc-shaped or ring-shaped.

Each magnetic elements 1-2 of the plate assembly 1-0 may be made of a permanet magnet, and each magnetic element 2-6 of the container assembly 2-0 may be made of a permanet magnet. Alternatively, each magnetic elements 1-2 of the plate assembly 1-0 may be made of a permanet magnet, and each magnetic element 2-6 of the container assembly 2-0 may be made of a ferromagnetic material. Alternatively, each magnetic elements 1-2 of the plate assembly 1-0 may be made of a ferromagnetic material, and each magnetic element 2-6 of the container assembly 2-0 may be made of a permanet magnet.

Preferably, the permanet magnets are rare-earth magnets.

What is claimed is:

1. A hanging spice dispenser comprising:
   a plate assembly having a top surface and a bottom surface, the plate assembly comprising:
      a non-magnetic planer plate having a flat bottom surface, the non-magnetic planer plate capable of being securely mounted horizontally;
      a plurality of magnetic elements embedded in the non-magnetic planer plate at pre-determined locations;

a container assembly for storing spices, the container assembly comprising:

a plurality of generally cylindrical spice containers;

each container comprising a removable cap having a central portion, a middle portion and a peripheral portion, the removable cap removably attached to the corresponding generally cylindrical spice container, the middle portion of the removable cap having portions defining a plurality of holes for dispensing spices, the removable cap having a surface area greater than the surface area of the magnetic element of the plate assembly; and a magnetic element securely attached to the central portion of the removable cap; magnetic attraction force between the magnetic element of the container and the magnetic element of the plate assembly being exerted when the container is placed in proximity to the plate assembly, the container capable of magnetically attaching to the bottom surface of the plate assembly, the container capable of detaching from the bottom surface of the plate assembly when force is applied to the container, the removable cap of the container and the bottom surface of the plate assembly forming self-seal in order to prevent air and moisture from entering into the generally cylindrical container when the container is magnetically attached to the plate assembly; and in which the removable cap further comprises: a generally circular cover for covering the middle portion of the removable cap of the container assembly, the generally circular cover rotatably mounted on the removable cap, the generally circular cover having portions defining a plurality of holes, the holes on the generally circular cover having rotational symmetry, the holes on the generally circular cover capable of variably overlapping with the holes in the middle portion of the removable cap so that spices can be dispensed at continuously variable flow rate.

2. The hanging spice dispenser as defined in claim 1, in which the plate assembly further comprises: an adhesive taped on the non-magnetic planer plate in order to securely attach the plate assembly to a horizontal bottom portion of a kitchen cabinet or a shelf.

3. The hanging spice dispenser as defined in claim 1, in which the non-magnetic planer plate of the plate assembly has portions defining a hole in order to receive a screw or a nail.

4. The hanging spice dispenser as defined in claim 1, in which each magnetic element of the plate assembly is disc-shaped.

5. The hanging spice dispenser as defined in claim 1, in which each magnetic element of the plate assembly is ring-shaped.

6. The hanging spice dispenser as defined in claim 1, in which the generally cylindrical spice container of the container assembly is transparent.

7. The hanging spice dispenser as defined in claim 1, in which the generally cylindrical spice container of the container assembly is translucent.

8. The hanging spice dispenser as defined in claim 1, in which the removable cap screws into the generally cylindrical container of the container assembly.

9. The hanging spice dispenser as defined in claim 1, in which the removable cap snaps into the generally cylindrical container of the container assembly.

10. The hanging spice dispenser as defined in claim 1 in which the magnetic element of the container is embedded in the central portion in the removable cap of the container.

11. The hanging spice dispenser as defined in claim 1, in which each magnetic element of the container assembly is disc-shaped.

12. The hanging spice dispenser as defined in claim 1, in which each magnetic element of the container assembly is ring-shaped.

13. The hanging spice dispenser as defined in claim 1, in which each magnetic element of the plate assembly is made of a permanent magnet, and each magnetic element of the container assembly is made of a permanent magnet.

14. The hanging spice dispenser as defined in claim 1, in which each magnetic element of the plate assembly is made of a permanent magnet, and each magnetic element of the container assembly is made of a ferromagnetic material.

15. The hanging spice dispenser as defined in claim 1, in which each magnetic element of the plate assembly is made of a ferromagnetic material, and each magnetic element of the container assembly is made of a permanent magnet.

* * * * *